United States Patent
Kawashima et al.

[11] Patent Number: 6,003,485
[45] Date of Patent: Dec. 21, 1999

[54] HELICAL INTAKE PORT FOR AN INTERNAL COMBUSTION ENGINE

[75] Inventors: Junichi Kawashima; Toshifumi Nishimura, both of Yokosuka; Seiji Niinuma, Gunma, all of Japan

[73] Assignee: Nissan Motor Co., Ltd., Kanagawa, Japan

[21] Appl. No.: 09/045,113

[22] Filed: Mar. 20, 1998

[30] Foreign Application Priority Data

Jun. 10, 1997 [JP] Japan .................................. 9-152479

[51] Int. Cl.$^6$ ................................ F01L 3/00; F02B 31/00
[52] U.S. Cl. ................................... 123/188.14; 123/306
[58] Field of Search ............................... 123/188.14, 306

[56] References Cited

U.S. PATENT DOCUMENTS

| | | | |
|---|---|---|---|
| 3,945,349 | 3/1976 | Elsbett et al. | 123/188.14 |
| 3,945,363 | 3/1976 | Elsbett et al. | 123/188.14 |
| 4,286,554 | 9/1981 | Okamoto | 123/188.14 |
| 4,312,309 | 1/1982 | Nakanishi et al. | 123/188.14 |
| 4,406,258 | 9/1983 | Sekiya et al. | 123/188.14 |
| 4,519,346 | 5/1985 | Nakanishi et al. | 123/188.14 |

FOREIGN PATENT DOCUMENTS

| | | | |
|---|---|---|---|
| 55-46003 | 3/1980 | Japan | 123/188.14 |
| 55-46005 | 3/1980 | Japan | 123/188.14 |
| 59-12124 | 1/1984 | Japan . | |

*Primary Examiner*—Tony M. Argenbright
*Assistant Examiner*—Arnold Castro
*Attorney, Agent, or Firm*—McDermott, Will & Emery

[57] ABSTRACT

This invention relates to a helical intake port for an internal combustion engine comprising a straight passage, a swirl passage connected to the straight passage and formed in a spiral around the center of an intake valve, and a cylindrical throat connected to the swirl passage via an opening over the whole area of the swirl passage. The cross-sectional area S of the swirl passage is determined by the following equation:

$$S = S0\left(1 - \frac{\beta}{\beta 0}\right)$$

where:
$\beta$=swirl angle from swirl start position,
$\beta 0$=whole swirl angle from swirl start position to swirl end position of swirl passage,
$S0$=cross-sectional area of swirl passage at swirl start position.

As a result, swirl can be enhanced and a high flow coefficient of the intake port can be realized.

1 Claim, 6 Drawing Sheets

HELICAL INTAKE PORT FOR AN INTERNAL COMBUSTION ENGINE

FIELD OF THE INVENTION

This invention relates to a helical intake port of a diesel engine.

BACKGROUND OF THE INVENTION

Helical intake ports having a spiral design are frequently used as intake ports in direct injection diesel engines. These helical intake ports set up a strong air swirl inside a cylinder, and promote the mixing of fuel and intake air.

Such a helical intake port is disclosed for example in Japanese Patent Tokkai Sho 59-12124 published by the Japanese Patent Office in 1984. FIG. 8 and FIG. 9 are respectively a vertical cross-sectional view and a plan view of this helical intake port. The helical intake port 10 in these figures comprises a straight passage 16, a swirl passage 13 having a spiral shape and connected to the straight passage 16, and a cylindrical throat 14 formed below the swirl passage 13. Intake air flowing in from the straight passage 16 is given a slewing motion by the swirl passage 13, and flows via the throat 14 from an intake valve 12 into a cylinder 17 while setting up a swirl flow. This prior art, by suitably designing the plan shape of the swirl passage of the intake port, enhances the swirl without reducing the flow coefficient of the intake port.

However, as the characteristics of air flow are determined not only by the plan shape of the swirl passage but also by the cross-sectional shape of same, it is difficult to set a swirl ratio to a desired value and to enhance the swirl and improve the flow coefficient of the intake port at the same time merely by specifying the plan shape of the swirl passage.

SUMMARY OF THE INVENTION

It is therefore an object of this invention to enhance swirl and improve a flow coefficient of an intake port by suitably designing both the plan and cross-sectional shapes of the swirl passage.

In order to achieve the above object, this invention provides a helical intake port for an internal combustion engine comprising a straight passage, a swirl passage connected to the straight passage and formed in a spiral around the center of an intake valve, and a cylindrical throat connected to the swirl passage via an opening over the whole swirl area of the swirl passage, wherein a cross-sectional area S of the swirl passage is determined by the following equation:

$$S = S0\left(1 - \frac{\beta}{\beta 0}\right)$$

where:

$\beta$=swirl angle from swirl start position, $\beta 0$=whole swirl angle from swirl start position to swirl end position of swirl passage, $S0$=cross-sectional area of swirl passage at swirl start position.

According to an aspect of this invention, a width W of the swirl passage is determined by the following equation:

$$W = W0\sqrt{\left(1 - \frac{\beta}{\beta 0}\right)}$$

where:

$\beta$=swirl angle from swirl start position, $\beta 0$=whole swirl angle from swirl start position to swirl end position of swirl passage, $W0$=width of swirl passage at swirl start position.

According to another aspect of this invention, a width L of the opening is determined by the following equation:

$$L = S0 \cdot \frac{C}{\frac{2\pi R \cdot \beta 0}{360}}$$

where:

$R$=average radius from center of intake valve of opening, $\beta 0$=whole swirl angle from swirl start position to swirl end position of swirl passage, $S0$=cross-sectional area of swirl passage at swirl start position, $C$=opening area ratio (ratio of projected area in one plane of opening relative to $S0$).

According to yet another aspect of this invention, the helical intake port further comprises a valve guide supporting the intake valve and forming part of the roof of the throat, wherein a machining allowance part is provided at the lower end of the valve guide.

The details as well as other features and advantages of this invention are set forth in the remainder of the specification and are shown in the accompanying drawings.

DESCRIPTION OF THE PREFERRED EMBODIMENTS

Figure 1:
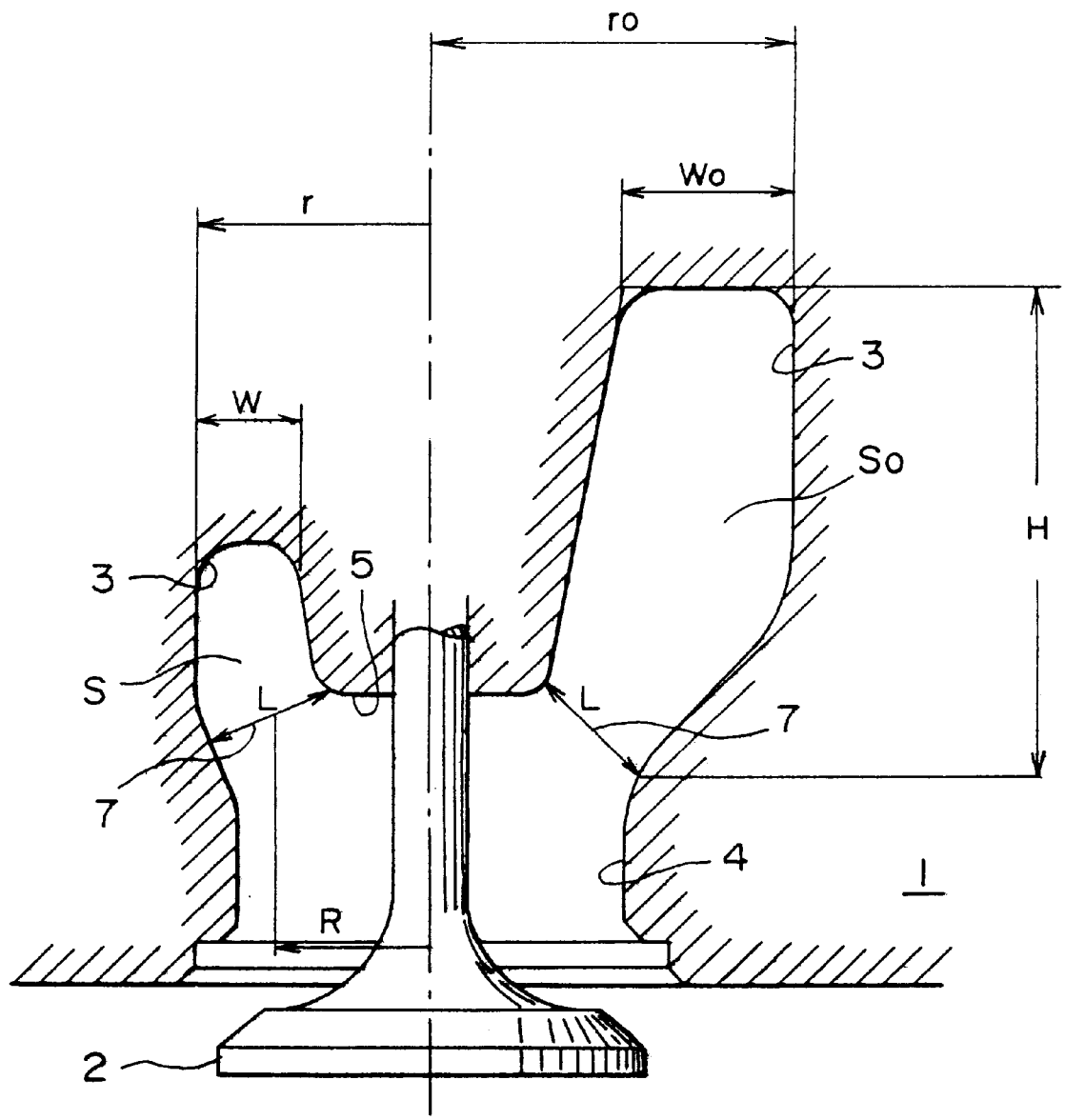
FIG. 1 is a vertical cross-sectional view of a helical intake port according to this invention.
Figure 2:
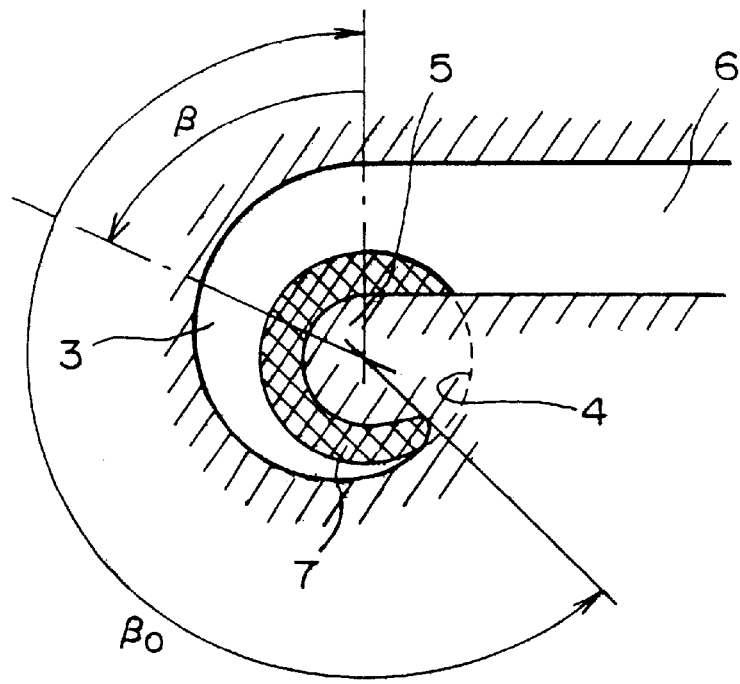
FIG. 2 is a horizontal cross-sectional view of the helical intake port according to this invention.

Referring to FIG. 1 and FIG. 2 of the drawings, a cylinder head 1 is provided with an intake valve 2 and a valve guide 5 supporting the intake valve 2. A swirl passage 3 is formed in a spiral around the valve guide 5 centered on the intake valve 2, a cylindrical throat 4 is formed underneath the swirl passage 3 and a straight passage 6 is connected upstream of the swirl passage 3.

A whole swirl angle from a swirl start position to a swirl end position of the swirl passage 3 is β0. The swirl passage 3 connects with the throat 4 through an opening 7 over the entire swirl area. The swirl start position is the position where the swirl passage 3 and straight passage 6 are connected. The swirl end position is the position where the cross-sectional area of the swirl passage 3 effectively becomes zero. The cross-sectional area S of the swirl passage 3 is set so that it decreases in a constant proportion from S0 at the swirl start position as a swirl angle β from the swirl start position becomes larger, and becomes zero at the swirl end position.

The cross-sectional area S of the swirl passage 3 is determined by the following equation:

$$S = S0\left(1 - \frac{\beta}{\beta 0}\right)$$

where:

β=swirl angle from swirl start position,

β0=whole swirl angle from swirl start position to swirl end position of swirl passage 3, and S0=cross-sectional area of swirl passage 3 at swirl start position.

Figure 3:
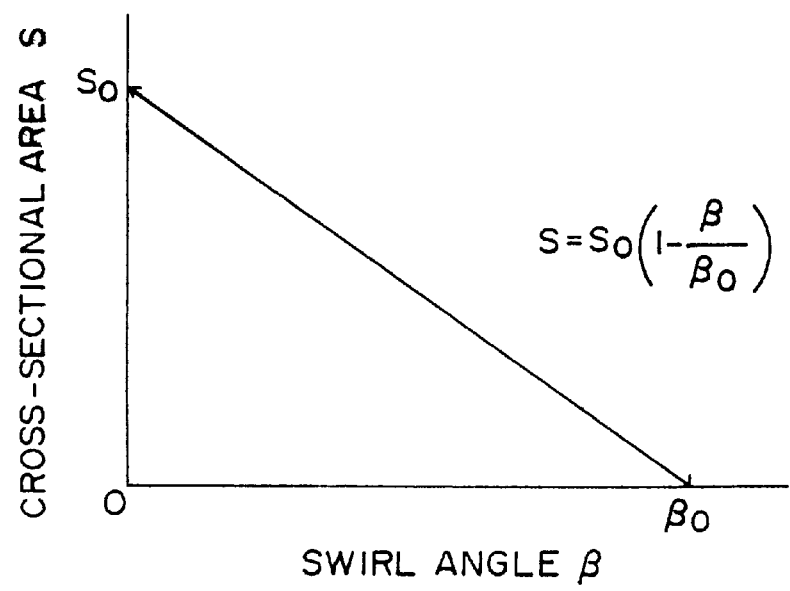
FIG. 3 is a graph showing a relation between a cross-sectional area and a swirl angle of the swirl passage.

FIG. 3 shows a relation between the cross-sectional area S and swirl angle β of the swirl passage 3. The cross-sectional area S decreases in a constant proportion as the swirl angle β becomes larger. As intake air, the amount of which corresponds to a decrease of cross-sectional area of the swirl passage 3, is introduced into the throat 4 through the opening 7 from the swirl passage 3, if the cross-sectional area S of the swirl passage 3 decreases in a constant proportion over the whole swirl area, the amount of intake air introduced into the throat 4 through the opening 7 from the swirl passage 3 becomes constant over the whole swirl area.

As a result, the whole swirl area can be uniformly utilized for setting up a swirl, a flow with equal speed in all parts of the opening 7 can be introduced from the intake valve 2 into a cylinder, and the swirl generating efficiency in the cylinder is improved.

Also, as the cross-section of the swirl passage 3 is effectively rectangular, the width W of the swirl passage 3 is determined by the following equation:

$$W = W0\sqrt{\left(1 - \frac{\beta}{\beta 0}\right)}$$

where:

β=swirl angle from swirl start position,

β0=whole swirl angle from swirl start position to swirl end position of swirl passage 3, and W0=width of swirl passage 3 at swirl start position.

Figure 4:
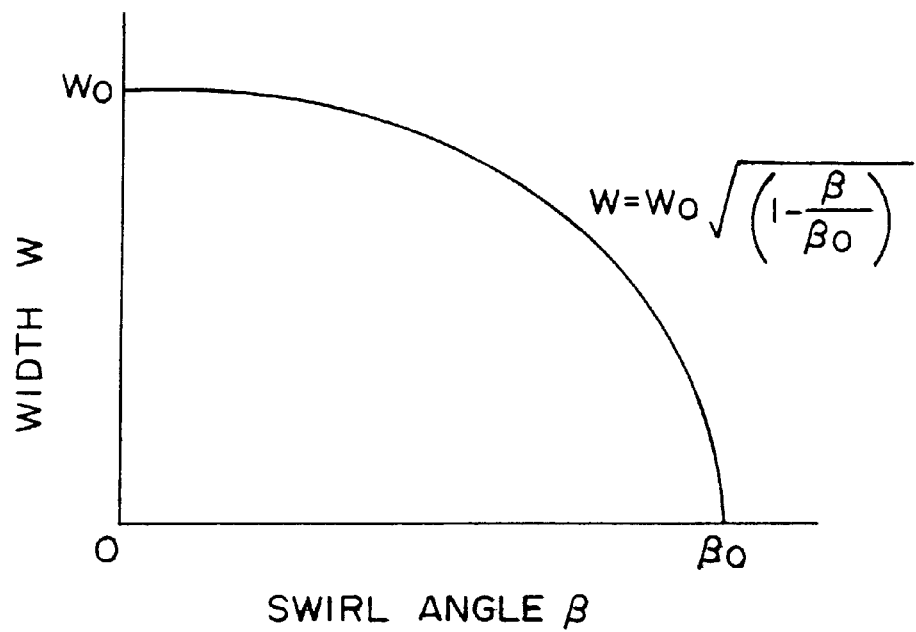
FIG. 4 is a graph showing a relation between a width and a swirl angle of the swirl passage.

As a result, as shown in FIG. 4, the width W of the swirl passage 3 decreases in direct proportion to the square root of the cross-sectional area S of the swirl passage 3 as the swirl angle β increases. The radius r from the center of the intake valve 2 of the swirl passage 3 progressively decreases as the swirl angle β becomes larger, and smoothly varies over the whole swirl area from a maximum radius r0 at the swirl start position to a minimum radius at the swirl end position.

As the cross-sectional area S of the swirl passage 3 decreases in a fixed proportion, the height H of the swirl passage 3 is effectively in direct proportion to its width W (i.e. His directly proportional to the square root of the variation of S). Therefore, the cross-section of the swirl passage 3 has an almost fixed shape throughout its length.

Hence, as the cross-section of the swirl passage 3 maintains an almost fixed shape, intake air flows along the internal circumference of the swirl passage 3 with very little turbulence. The flow coefficient of the intake port is therefore improved, and the swirl is enhanced.

A width L of the opening 7 connecting the swirl passage 3 and throat 4 is determined by the following equation:

$$L = S0 \cdot \frac{C}{\frac{2\pi R \cdot \beta 0}{360}}$$

where:

R=average radius from center of intake valve 2 of opening 7,

β0=whole swirl angle from swirl start position to swirl end position of swirl passage 3, S0=cross-sectional area of swirl passage 3 at swirl start position, and C=opening area ratio.

Herein, the opening area ratio C is the ratio of the projected area in one plane of the opening 7 relative to the cross-sectional area S0 at the swirl start position of the swirl passage 3, and it is set to a value of 0.6–1.0.

Figure 5:
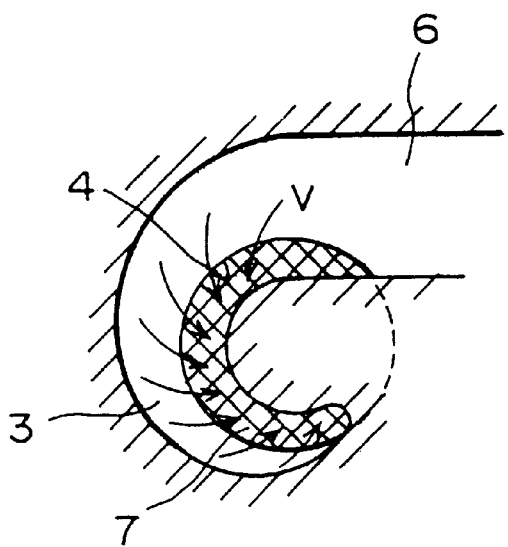
FIG. 5 is a horizontal cross-sectional view of the helical intake port according to this invention, showing a state of swirl flow.

As a result, the width L of the opening 7 is almost constant over the whole swirl area of the swirl passage 3, as shown in FIG. 5. The speed and angular momentum of intake air entering the throat 4 from the swirl passage 3 therefore become uniform over the whole swirl area, so a strong swirl is obtained together with a high flow coefficient of the intake port.

By adjusting the width L of the opening 7, the entry speed V of intake air can be regulated, and the swirl ratio of the swirl which is generated can be changed. Specifically when the width L of the opening 7 increases, the entry speed of intake air from the opening 7 decreases, the swirl ratio decreases, and the flow coefficient of the intake port improves. Conversely, when the width L of the opening 7 is decreased, the entry speed of intake air increases, the swirl ratio increases, and the flow coefficient of the intake port falls.

Figure 6:
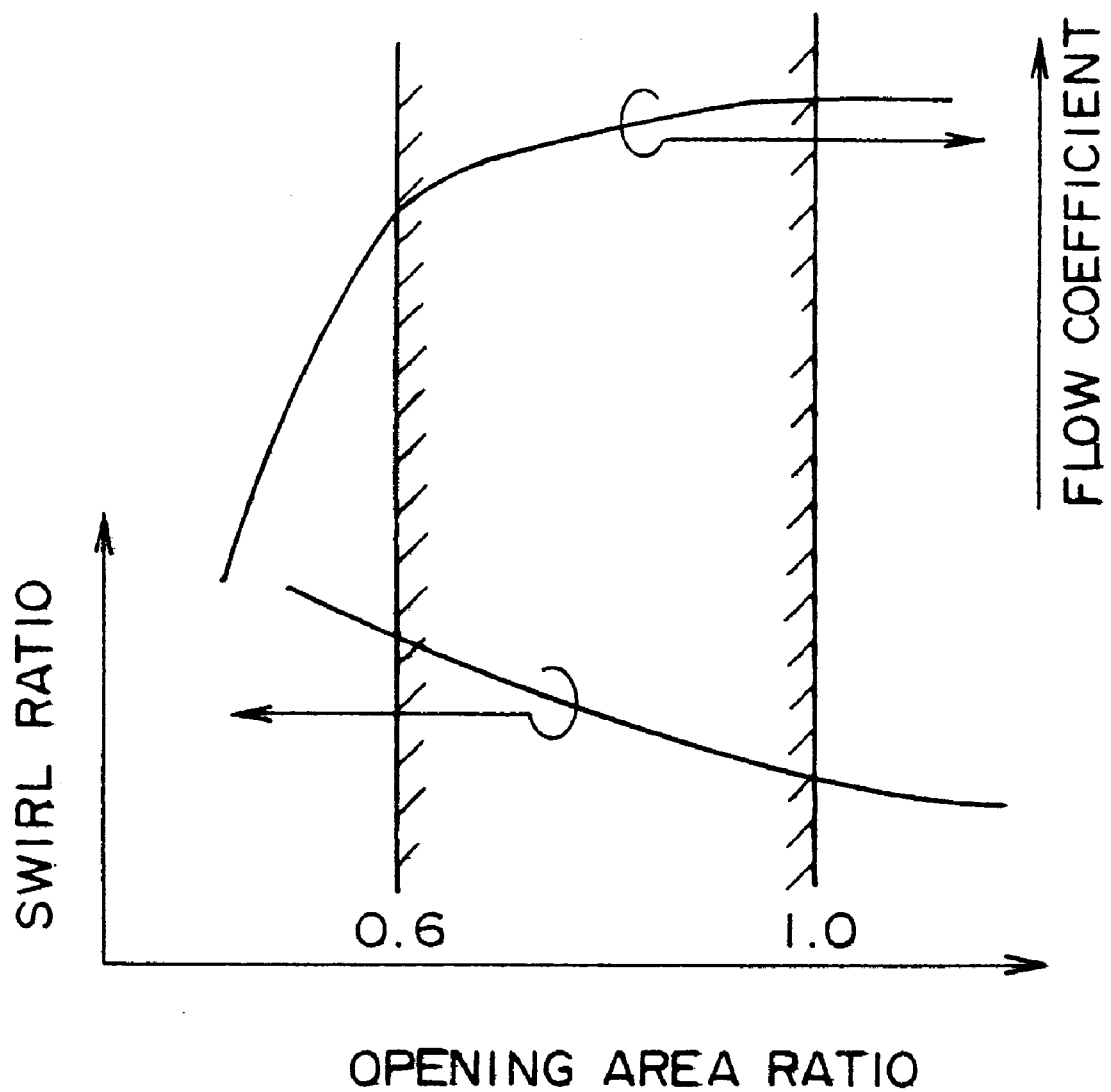
FIG. 6 is a graph showing a relation between an opening area ratio and a swirl ratio, and a relation between an opening area ratio and a flow coefficient of the intake port.

Herein, when the opening area ratio C is made larger than 1.0, the variation of both the swirl ratio and the flow coefficient of the intake port decrease as shown in FIG. 6. This is due to the fact that the entry speed of intake air is fixed according to the cross-sectional area S0 of the swirl passage 3 at the swirl start position. When the opening area ratio C is made smaller than 0.6 on the other hand, the flow coefficient of the intake port sharply decreases.

Therefore, if the width L of opening 7 is set so that the opening area ratio C lies within a range of 0.6–1.0, the swirl ratio can be adjusted without much varying the flow coefficient of the intake port.

Figure 7:
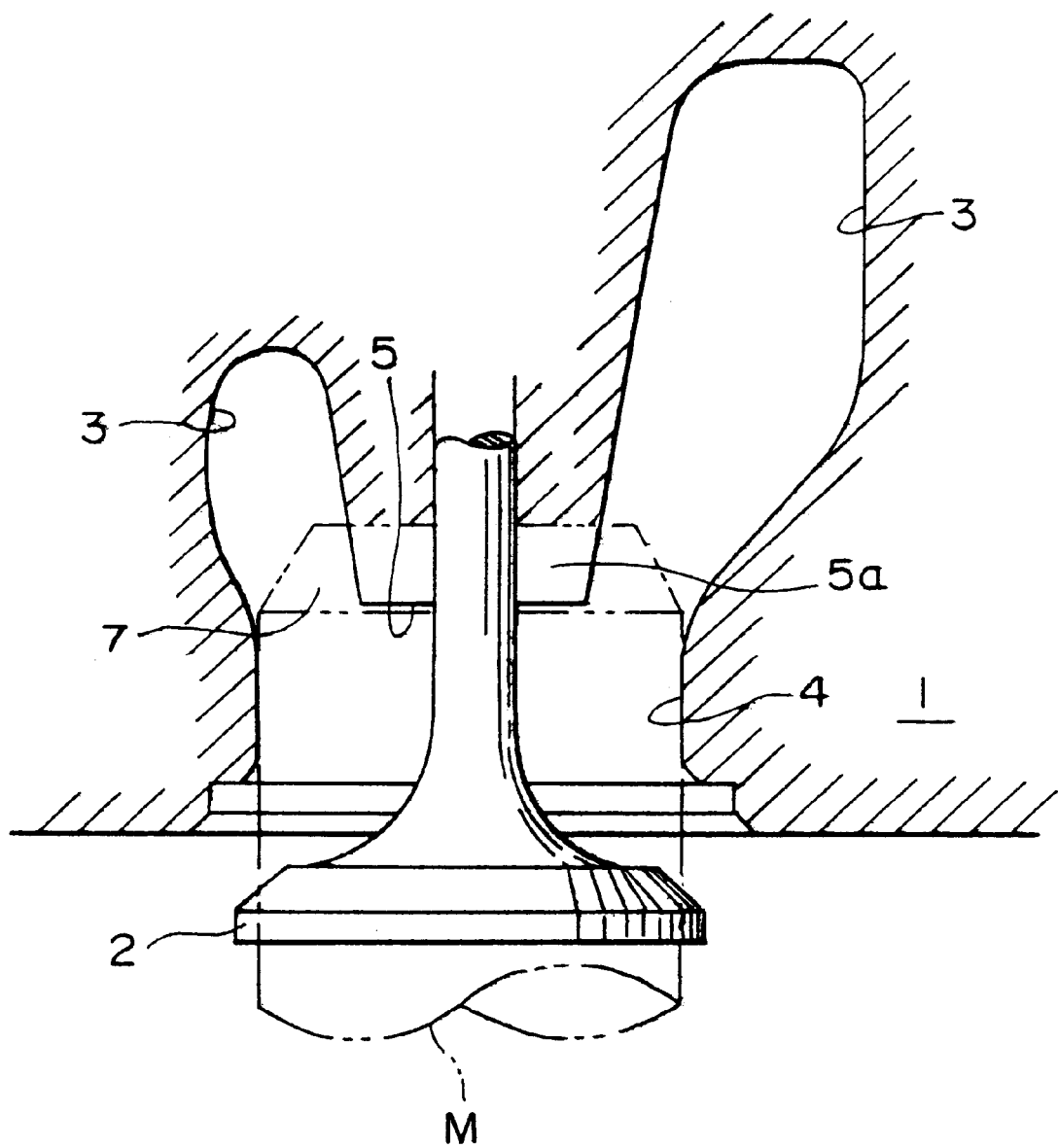
FIG. 7 is similar to FIG. 1, but showing a second embodiment of this invention.
Figure 8:
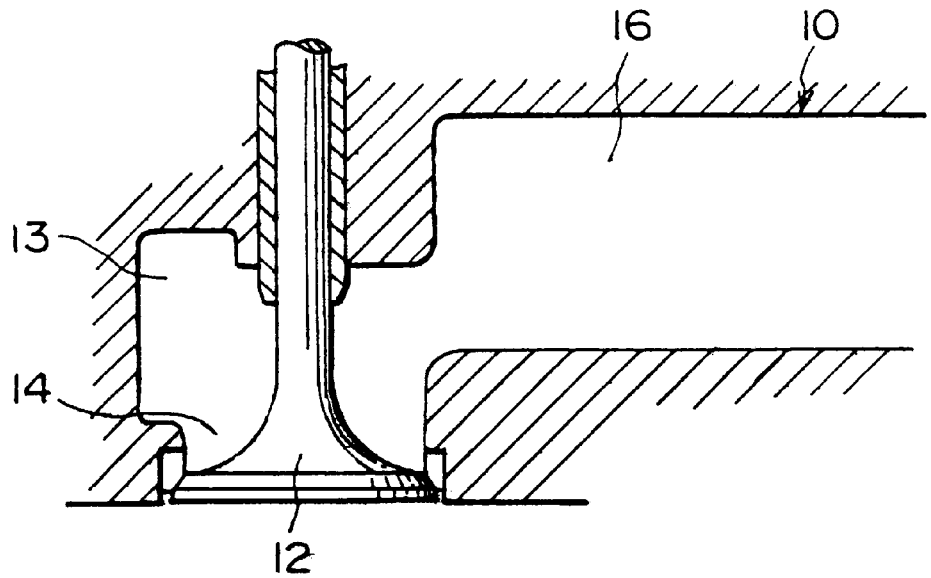
FIG. 8 is a vertical cross-sectional view of a prior art helical intake port.
Figure 9:
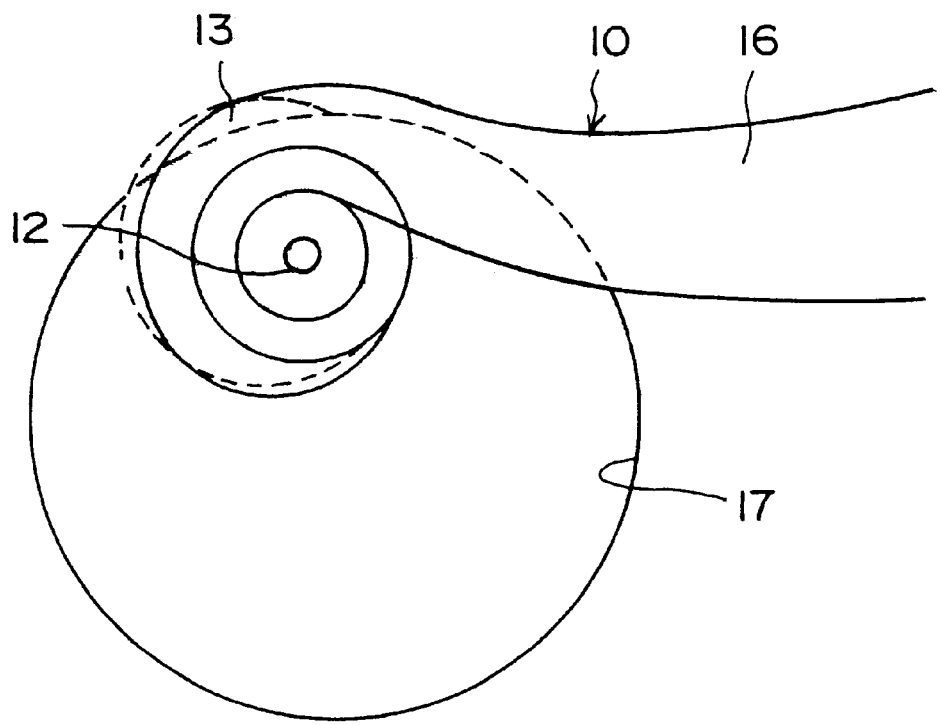
FIG. 9 is a plan view of the prior art helical intake port.

FIG. 7 shows a second embodiment of this invention. A machining allowance part 5a is provided at the lower end of the valve guide 5 that supports the intake valve 2.

If a cutting tool M is inserted in the throat 4 below the cylinder head 1, and the machining allowance part 5a is cut by the cutting tool M, the width L of the opening 7 and height of the throat 4 change, and the flow coefficient and swirl ratio of the intake port can be adjusted.

As the required swirl ratio varies due to differences of intake systems (natural aspiration or supercharging), fuel injection pump specifications or vehicle specifications of importing countries, in the prior art, the shape of a mold for a cylinder head had to be changed according to the required swirl ratio, but according to this invention, a mold with the same shape may be used in all cases.

The embodiments of this invention in which an exclusive property or privilege is claimed are defined as follows:

What is claimed is:

1. A helical intake port for an internal combustion engine comprising:

a straight passage, a swirl passage connected to said straight passage and formed in a spiral around a center of an intake valve, and a cylindrical throat connected to said swirl passage via an opening over an entire swirl area of said swirl passage, characterized in that a ratio C of projected area in one plane of said opening relative to a cross-sectional area of said swirl passage at swirl start position is between 0.6 and 1.0.

* * * * *